United States Patent
Harnden, Jr.

[11] 3,742,174
[45] June 26, 1973

[54] INDUCTION COOKING APPLIANCE INCLUDING COOKING VESSEL HAVING MEANS FOR TRANSMISSION OF TEMPERATURE DATA BY LIGHT PULSES

[75] Inventor: John D. Harnden, Jr., Schenectady, N.Y.

[73] Assignee: General Electric Company, Schenectady, N.Y.

[22] Filed: Dec. 29, 1971

[21] Appl. No.: 213,336

[52] U.S. Cl............ 219/10.49, 219/10.77, 219/502, 220/9 R, 350/83.3 H, 336/82
[51] Int. Cl. .............................................. H05b 5/04
[58] Field of Search...................... 219/10.44, 10.75, 219/10.77, 10.79, 438, 441, 502; 250/83.3 H, 205, 215; 356/43, 218; 338/15, 18, 19; 220/9 R; 336/23, 82, DIG. 2; 331/113

[56] References Cited
UNITED STATES PATENTS

| | | | |
|---|---|---|---|
| 2,314,865 | 3/1943 | Bierwirth | 219/10.75 |
| 2,415,688 | 2/1947 | Hall | 219/10.49 |
| 3,619,612 | 11/1971 | Belke | 250/83.3 H |
| 2,901,714 | 8/1959 | Baker | 336/82 |
| 2,133,494 | 10/1938 | Waters | 219/10.49 |
| 3,530,499 | 9/1970 | Schaoeder | 219/10.49 |
| 3,449,629 | 6/1960 | Wigert et al. | 219/502 XR |

Primary Examiner—J. V. Truhe
Assistant Examiner—B. A. Reynolds
Attorney—John F. Ahern, Patrick D. Ward et al.

[57] ABSTRACT

Herein disclosed is an induction cooking/warming appliance wherein an induction coil is located below a vessel supporting means, such as a counter. The counter may have a passage therethrough for the transmission of light, or it may be a solid body of transparent or translucent material. A double-walled vessel for containing food to be cooked or warmed is provided. The vessel is supportable on the counter. An inner wall of the vessel is inductively heated by a main magnetic field produced by the induction coil; but, an outer wall of the vessel, which is in contact with the counter on which the vessel is supported, is not inductively heated. Moreover, the outer wall of the vessel transmits light. Included within the vessel between the two walls thereof is a temperature detection unit which includes a temperature sensor unit arranged for sensing the temperature of the inner wall of the vessel and means responsive to the magnetic field produced by the induction coil for energizing an LED to produce light pulses at a rate corresponding to the temperature sensed by said temperature sensor unit. These light pulses are transmitted through the outer wall of the vessel and either through the counter or through a passage in the counter to a temperature receiving unit which includes a photodetector which is instrumental in developing a signal representative of the temperature of interest. Various embodiments of the vessel and the components thereof are disclosed.

12 Claims, 9 Drawing Figures

PATENTED JUN 26 1973

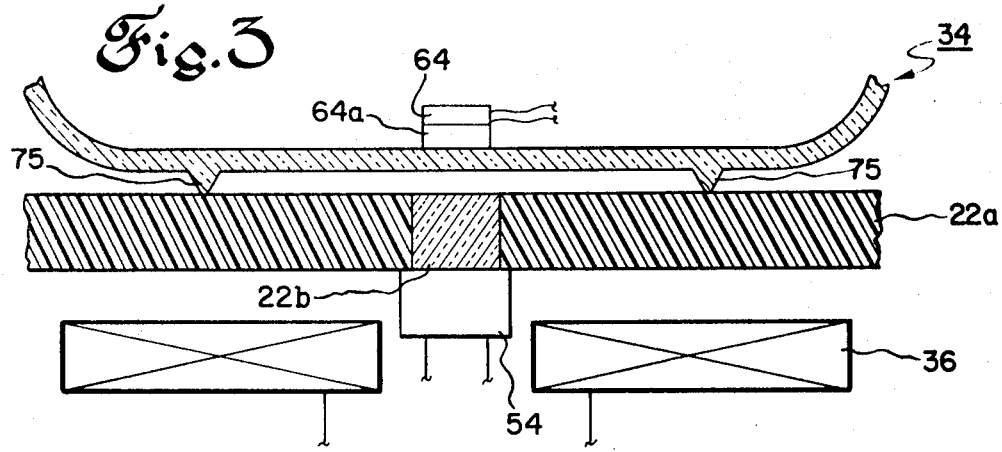
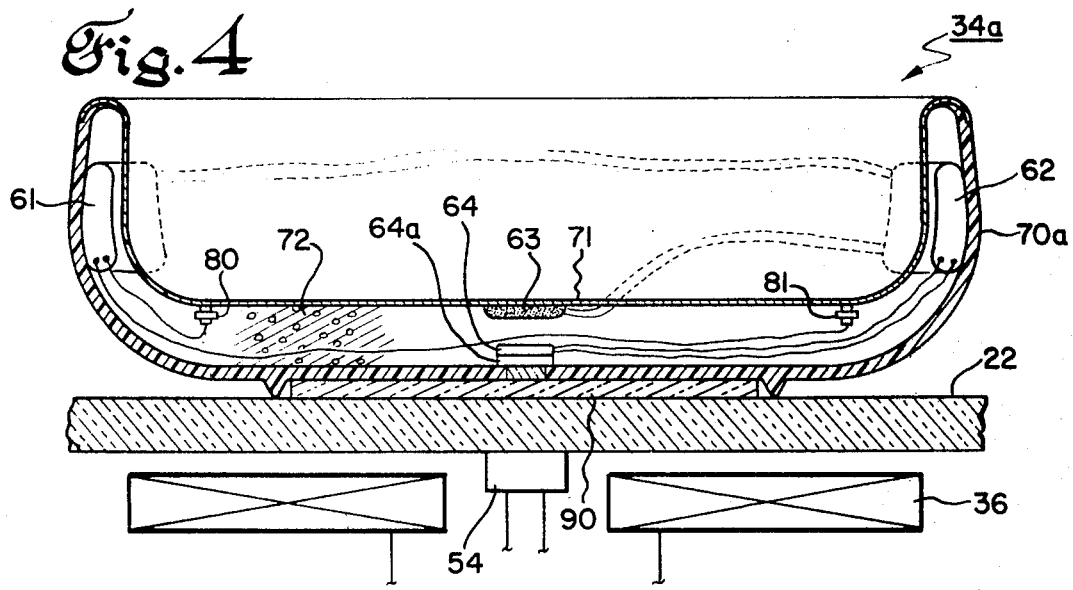
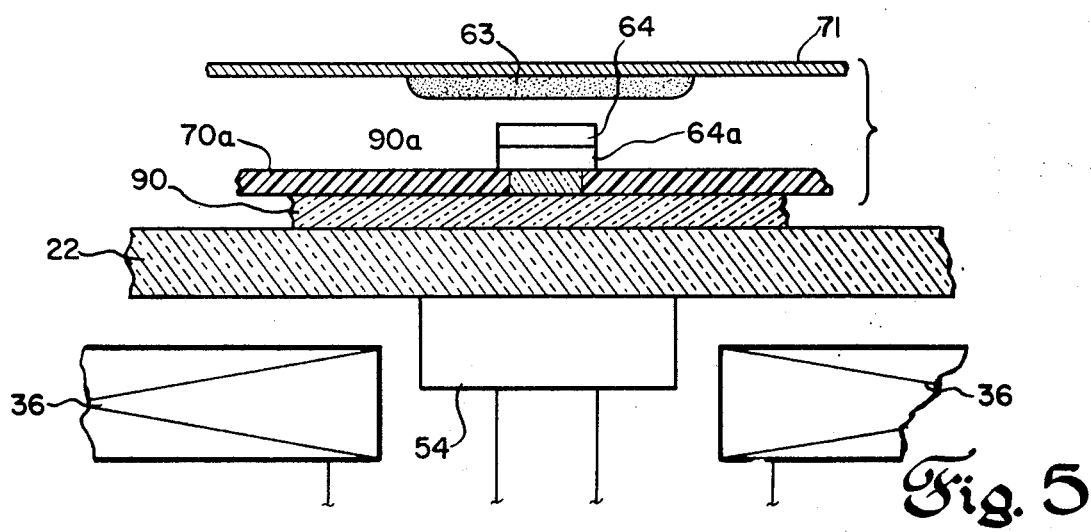

INDUCTION COOKING APPLIANCE INCLUDING COOKING VESSEL HAVING MEANS FOR TRANSMISSION OF TEMPERATURE DATA BY LIGHT PULSES

CROSS REFERENCES TO RELATED APPLICATIONS

A fuller appreciation of induction cooking appliances, generally, as well as some of the sophistications which may be embodied therein is to be had by referring to the following U.S. Pat. applications: Ser. No. 200,526, filed Nov. 19, 1971, in behalf of David L. Bowers et al. titled SOLID STATE INDUCTION COOKING APPLIANCE; Ser. No. 200,424, filed Nov. 19 1971, in behalf of J.D. Harnden, Jr. et al., titled SOLID STATE INDUCTION COOKING APPLIANCES AND CIRCUITS. The entire right, title and interest in and to the inventions described in the aforesaid patent applications, as well as in and to the aforesaid applications, and the entire right, title and interest in and to the invention hereinafter described, as well as in and to the patent application of which this specification is a part, are assigned to the same assignee.

BACKGROUND OF THE INVENTION

This invention pertains to induction cooking or warming appliances, in general; and, in particular, to a novel food processing vessel especially suitable for use in conjunction with induction appliances of the aforesaid type, the novel vessel provided by the invention having incorporated therein means for extracting electric power from the main induction field of the appliance for the purpose of producing local power for use by load utilization means in the vessel.

An important aspect, among others, of the present invention is the provision of a novel food processing vessel suited for use with induction appliances of the aforesaid type wherein said vessel includes a temperature detection unit which includes the aforesaid means for extracting electrical energy from the main induction field of the appliance for the purpose of initiating the wireless transmission of temperature data by means of light pulses radiated from the vessel to a receiving unit which may be remotely located elsewhere on the appliance.

Prior art electric ranges (i.e., those employing resistance heater surface elements) and gas ranges present a number of problems with respect to temperature sensing. With such prior art ranges the approach most often employed is to directly sense the temperature of the vessel. For this purpose a contact-type temperature sensor unit is usually employed; i.e., the temperature sensor unit is positioned so that it is in direct contact with the cooking vessel being heated. The vessels involved are usually fabricated from cast iron, stainless steel, copper or copper-clad stainless steel, etc. These vessels are considered conventional and are abundantly available. Temperature sensing as done in the prior art has not proved entirely satisfactory for, among others, the following reasons:

First, with prior art electric and gas ranges the primary heating source (e.g., the surface mounted electrical resistance coils or the gas fed flames) spuriously heats the temperature sensing unit and, moreover, other heated parts of the range thermally perturb the temperature sensing unit as well.

Second, in prior art electric and gas ranges because of the relatively high temperatures involved, principally because of the nature of the primary heating source and its proximity to the vessel-contacting temperature sensor, the materials from which the temperature sensing units and their associated components may be fabricated are rather restricted.

Third, in prior art electric and gas ranges, principally because of the high temperatures occasioned by the nature of the primary heating source and its proximity to the contact-type temperature sensing unit extensive thermal shielding, or insulation is required.

Fourth, in prior art electric and gas ranges because of the severe thermal stresses created in the vessel-contacting temperature sensing unit, as a consequence of the high temperatures occasioned by the nature of the primary heating source and its proximity to the temperature sensing unit, relatively massive and sophisticated as well as somewhat mechanically complex spring arrangements and structures were required for the purpose of maintaining adequate contact between the temperature sensing unit and the cooking vessel.

The four problems, hereinbefore mentioned, are discussed in greater detail hereinafter.

In prior art electric and gas ranges the temperature sensing means and its associated components are directly heated, spuriously, in some measure by a high temperature primary heating source. For example, in the conventional electric range a temperature sensing unit is located at the center of a spirally wound resistance heating coil. This heating coil and the temperature sensing unit are both mounted on the top or working surface of the range counter. A cooking vessel rests on and contacts the heating coil as well as the temperature sensing unit. Although the temperature sensing unit directly contacts the heated cooking vessel, it is also subjected to direct spurious heating by the range's heating coil; e.g., by radiation and convection. In addition, the temperature of the temperature sensing unit is influenced by, among other things, the metallic counter of the electric range. Similarly in a gas range, the flames directly heat the temperature sensing unit. Moreover, heated metallic gridirons as well as the heated metallic counter top thermally influence the temperature sensing unit.

Also, in prior art electric and gas ranges, because of the nature of the primary heating source and its proximity to the temperature sensing unit, various component parts of the temperature sensing unit have to be fabricated with materials which are capable of withstanding relatively high temperatures; e.g., approximately 1,400°F–1,600°F. For example, in the conventional prior art electric range wherein the temperature sensing unit is located at the center of the spiral resistance heating coil which is, in turn, mounted on the metallic counter top of the range, the temperature sensing unit and its associated components are subjected to the elevated temperatures hereinbefore set forth. Significant thermal stresses are, as a result, induced in the temperature sensing unit as well as in its associated components. Similar conditions occur in gas ranges.

In prior art electric and gas ranges, principally because of the nature of the primary heating source and its proximity to the temperature sensing unit contacting the cooking vessel, the temperature sensing unit as well as its associated components are required to have extensive thermal shielding, or insulation, for the purpose of minimizing the influences of spurious heating by the high temperature heating source as well as by the metallic range counter and metallic gridirons. Without some effective thermal shielding or insulation, the temperature sensing unit will provide a false indication of temperature unless temperature compensation is appropriately applied. However, such compensation is not feasible because of the wide range of cooking conditions. For example, it is very difficult to achieve a system in which both steady-state and transient, or dynamic, compensation is easily achieved. In any event, cooking performance is compromised. Moreover, without effective thermal shielding severe thermal stresses induced in the various component parts of the temperature sensing unit will cause a disabling, or sometimes destruction, of the temperature sensing unit.

The prior art temperature sensing units, especially those which are employed with the prior art electric ranges for the purpose of contacting the cooking vessel, are generally massive and are of a rather sophisticated and somewhat mechanically complex structure and arrangement. The high temperature environment within which the temperature sensing unit is located permits severe thermal stresses to be induced in the various components of the temperature sensing unit. These stresses tend to promote warping of the various components. For example, because of the aforesaid thermal stresses, a relatively massive double-spring arrangement is usually employed in combination with a temperature responsive device. The temperature responsive device, acting against spring restraint, contacts the bottom surface of the cooking vessel. The vessel rests on a flat spiral heating coil disposed on the top surface of the range counter. The massive double-spring arrangement is rather stiff and this is due in large part to the need to make the arrangement structurally resistant to thermal deformation. Such a spring arrangement generally functions satisfactorily to enable the temperature sensing unit to contact a relatively smooth flat-bottom surface of a relatively heavy cooking vessel such as a cast iron pot containing foodstuff to be cooked. Being in contact with the surface of the vessel, it is conceptually possible for the temperature sensing unit to detect the temperature of the vessel. However, in the event that a relatively light weight pot is used or if a pot having a rather irregularly contoured bottom surface is used, such prior art contact type temperature sensing units employing the aforesaid stiff spring arrangement proved unsatisfactory. For example, if a cooking vessel is used which is not sufficiently heavy, there will be an insufficient weight to adequately compress the spring arrangement. One consequence will be that the vessel will not rest on the resistance heating coil in the most intimate contact possible therewith. The cooking vessel will, as a result, be raised or tilted and thereby make for inefficient heat transfer between the resistance heating coil and the vessel. In addition, a prior art contact-type sensor unit could not, obviously, be applied to a double-walled cooking vessel where no relationship exists between inner and outer wall temperatures; i.e., no relationship between the cook surface temperature and the outer wall temperature. Secondly, physical space or clearance resulting with vessels having feet which rest on counter tops in prior art ranges would require sensors having springs to make conventional temperature sensing heads travel rather large distances.

SUMMARY OF THE INVENTION

Although the invention is hereinafter described, and illustrated in the accompanying drawings, as being employed in conjunction with an induction range it is, nevertheless, to be understood that the invention's applicability is not limited to induction cooking or warming ranges but may be embodied in, for example, portable counter top warming or cooking appliances, such as warming trivets, as well as in other types of induction heating apparatus which need not, necessarily, be used for cooking or warming food.

One object of the present invention is the provision of a vessel for use with an induction range, said vessel including means for extracting electrical energy from the induction coil of the range for providing local power for load utilization means or local power for signal energy, such as signal energy for the wireless transmission of temperature data from the vessel to a remotely located receiver.

Another object of the invention is the provision of an induction cooking/warming appliance including a cooking/warming vessel, said appliance including a temperature sensing unit for sensing or detecting the temperature of cooking/warming vessel or utensil being heated.

Another object of the invention is the provision of an induction cooking/warming appliance including the aforesaid temperature sensing unit wherein said sensing unit is free from spurious heating.

Another object of the invention is the provision of an induction cooking/warming appliance including the aforesaid temperature sensing unit, the materials of fabrication of said temperature sensing unit not being restricted by the elevated temperatures heretofore encountered in prior art electric and gas ranges.

Another object of the invention is the provision of an induction cooking/warming appliance including the aforesaid sensing unit, said temperature sensing unit not requiring the thermal insulation or shielding in the ways or to the extent heretofore employed in prior art electric and gas ranges.

Another object of the invention is the provision of an induction cooking/warming appliance including the aforesaid temperature sensing unit, said temperature sensing unit being capable of accurately sensing the temperature of the vessel regardless of the weight of the vessel and/or the weight of the food therein and/or regardless of whether the vessel has or has not an irregular outer surface or contour; said temperature sensing unit not requiring the prior art spring construction or arrangement.

Another object of the invention is the provision of an induction cooking/warming appliance including a temperature sensing unit which can accurately detect the temperature of the vessel regardless of the fact that the vessel may have an outer wall which is thermally nonconductive.

Another object of the invention is the provision of an induction cooking/warming appliance including the aforesaid temperature sensing unit for sensing the temperature of a vessel being heated; said vessel being supported by a vessel supporting means having an uninterrupted working surface.

Another object of the invention is the provision of an induction cooking/warming appliance including wireless means for transmitting temperature data from the vessel to a location which is relatively remote from the vessel.

Another object of the invention is the provision of an induction cooking/warming appliance including wireless means for transmitting temperature data from a vessel being heated to a location remote therefrom; said wireless means being powered by a portion of the main induction field which is employed for heating the vessel.

Another object of the invention is the provision of a novel cooking/warming vessel which is adapted for being inductively heated as well as for initiating the wireless transmission of temperature data by means of light pulses radiated from the vessel to a relatively remote location.

The invention, hereinafter described and illustrated in the accompanying drawings, enables the achievement of the aforementioned objectives, as well as others, in that there is provided an induction cooking or warming appliance and a vessel adapted for being inductively heated. The vessel includes a portion in which heating current may be induced for the purpose of heating said portion as well as food contained within said vessel. The cooking appliance is comprised of a vessel supporting means in which no substantial heating current is induced when the supporting means is subjected to a changing magnetic field. The vessel supporting means includes a surface which is adapted for supporting the vessel. Advantageously, the aforementioned surface of the vessel supporting means may be an uninterrupted surface which may also serve as a working surface for the preparation of food, among other things. The cooking appliance is provided with an induction coil which is energizable from a suitable power source so as to provide a changing magnetic field of at least ultrasonic frequency. The changing magnetic field causes heating current to be induced in the aforementioned inductively heatable portion of the cooking vessel. As a result, food contained within the vessel may be heated. Also provided is a temperature sensing unit which is comprised of a temperature detection unit and a temperature receiving unit. Briefly, the temperature detection unit is incorporated in the vessel and said unit derives power from the aforementioned changing magnetic field produced by the remote induction coil. With the power thus derived, the temperature detection unit is enabled to transmit temperature data acquired by a temperature sensor unit located in the vessel by means of light pulses to a temperature receiving unit which may be remotely located elsewhere on the cooking appliance. The temperature receiving unit includes a photodetector which is coupled with a temperature signal processing circuit. Temperature data received by the receiving coil is processed in the temperature signal processing circuit and a signal is developed which is representative of the temperature of interest.

One feature of the invention resides in the transmission of temperature data by means of light pulses from a temperature detection unit to a remotely located temperature receiving unit. Since such transmission is made by means of light pulses no interference, or cross-talk, from the main field produced by the induction coil occurs.

Another feature of the invention resides in the provision of a novel cooking/warming vessel in which there is incorporated various electrical and electronic components; i.e., those components of which the temperature detection unit is comprised.

Other objects and features, as well as a fuller understanding of the invention, will appear by referring to the following detailed description, claims and drawings.

DESCRIPTION OF DRAWING FIGURES

FIG. 3 is a fragmentary cross section view showing an alternative construction of the range counter employed with the induction cooking range of the present invention.

FIG. 4 is a cross section view similar to the view shown in FIG. 2 but showing a modification of the cooking vessel employed with the present invention.

FIG. 5 is a fragmentary cross section view showing an enlargement of a portion of the view shown in FIG. 4.

DESCRIPTION OF PREFERRED EMBODIMENTS

Figure 1:
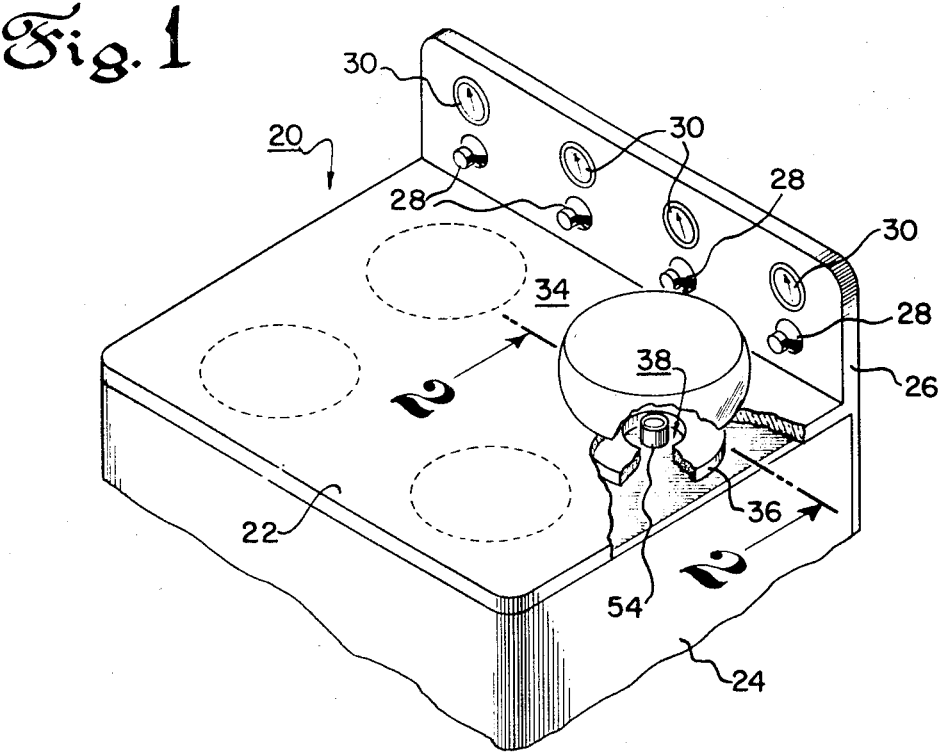
FIG. 1 is a perspective view of an induction cooking range showing the top or working surface thereof on which there is supported a cooking vessel.

In FIG. 1 there is illustrated a perspective view of part of an induction cooking range designated generally by the reference number 20. The range 20 is provided with a counter 22 which is suitably supported by a range substructure 24. Located at the rear of counter 22 and fastened to substructure 24 is an instrument and control panel 26. On panel 26 there is mounted a number of controls 28 and a like number of temperature indicators 30. Although temperature indicators 30 are illustrated in the drawing figures as being dial-type thermometers, it is to be understood that other display means such as digital displays of temperature or temperature ranges may be employed. In addition, such displays may provide a visible indication of rate of change of temperatures. On the top or working surface of the counter 22 there is illustrated four dotted line circles. These circles suggest locations where four cooking vessels, such as pots, pans, etc., may be located during the cooking process.

Figure 2:
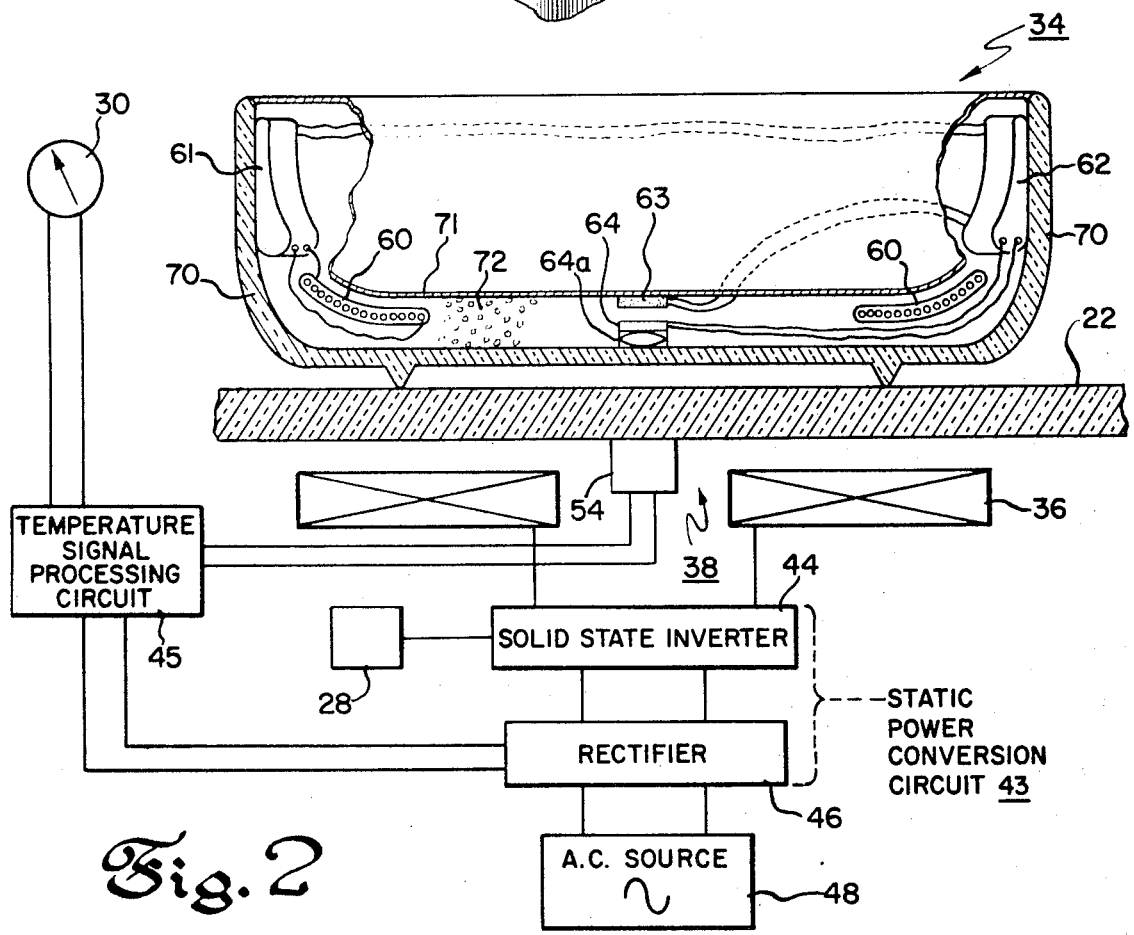
FIG. 2 is an enlarged cross section view as viewed along the section line 2—2' in FIG. 1. Also shown is block diagram of, among other things, an induction coil and power and control circuitry associated therewith.
Figure 7:
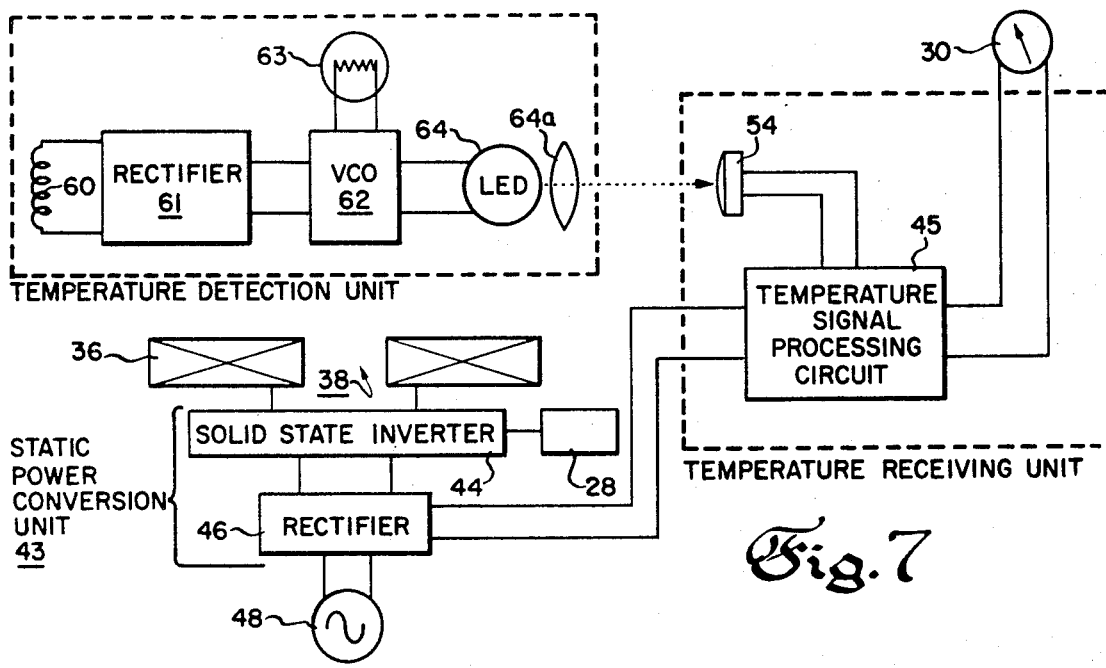
FIG. 7 is a block diagram showing the overall electronic and electrical system of the induction cooking or warming system according to the invention.

As illustrated, a cooking vessel 34 is rested on the working or top surface of counter 22, covering one of the dotted line circles. Below the counter 22 and positioned beneath each of the dotted line circles thereon is a separate induction coil 36. Each induction coil 36 is separated from the bottom surface of the counter 22 by an air gap. Each induction coil 36 is a relatively flat, spirally wound coil which includes at the center thereof a central aperture designated, generally, by the reference number 38. Each induction coil is electrically connected as shown in FIGS. 2 and 7 to the output of a solid state inverter 44 which, in turn, has an input which is electrically connected to the output of a rectifier 46. Inverter 44 is a solid state inverter and, as combined with rectifier 46, forms a static power conversion circuit designated, generally, by the reference number 43. The rectifier 46 includes an input which is electrically connected to a conventional A.C. source 48 which may be a 60 Hz, single phase, 110 or 220 volt source. More details as to the static power conversion circuit 43 including the rectifier 46 and inverter 44 may be had by referring to the patent applications hereinbefore cross-referenced.

Also shown in FIGS. 2 and 7 is one of the controls 28 which may, for example, be a switch which is electrically coupled with inverter 44 for the purpose of controling the flow of power therefrom to an induction coil 36. The control 28 is marked in degree F settings to enable the housewife to "call for" a particular temperature or temperature range performance. However, a temperature indicator 30 associated with a particular control 28 provides a visible indication of the actual temperature of vessel 34. The temperature indicator 30 provides, in addition, an indication of the rate of temperature rise and fall. This rate information is considered to be an important aspect of the cooking process.

The rectifier 46 may be a regulated full-wave bridge rectifier employing solid state devices and operating to convert A.C. input power to D.C. output power. Also, the inverter 44 employs SCR's which in performance of their control switching function enable the inverter 44 to deliver relatively high frequency power (ultrasonic or above) to drive or power the induction coil 36.

As discussed in more detail hereinafter, vessel 34 has incorporated therein a temperature detection unit which includes means for providing light pulse signals representative of the sensed temperature of the cooking vessel. These light pulses are received by a temperature receiving unit which is designated, generally, by the reference number 50. (FIG. 7). The temperature receiving unit 50 includes photodetector means (e.g., a silicon photodiode) 54 as shown in FIGS. 1–4, located below the range counter 22. From temperature receiving unit 50 the aforementioned light pulses are converted to suitable electrical signals which are delivered to an input of a temperature signal processing circuit 45 (FIGS. 2 and 7). The temperature signal processing circuit 45 develops an output signal representative of the temperature of cooking vessel 34 and this output signal is delivered to the temperature indicator 30 for display.

As indicated in FIGS. 2 and 7, temperature signal processing circuit 45 includes: a first input coupled to rectifier 46 for deriving therefrom a D.C. voltage; a second input in the form of a pair of electrical conductors which extend from the photodetector means 54 of temperature receiving unit 50; and, an output comprising a pair of conductors directly connected to the temperature indicator 30.

In the cross section view of FIG. 2 one embodiment of the cooking vessel 34 according to the invention is illustrated. As shown, the vessel 34 is comprised of an outer cup, or cup-like member, 70. Nested within the outer cup 70 is an inner cup 71. At the top rim of vessel 34 where the inner and outer cups 71 and 70 contact each other, they are bonded and sealed so as to provide a hermetically sealed double-walled vessel 34. The space between the inner wall surfaces of the cups 70 and 71 may be filled with thermal insulation material 72. In the alternative, the space between the opposing surfaces of cups 70 and 71 may be air filled or they may be evacuated. However, as shown in FIG. 2 the material 72 may be foamed thermal insulating material which is suitable for service as a thermal shield or insulating substance. The inner cup 71 may be formed from a relatively thin sheet of magnetic stainless steel. Generally, inner cup 71 is preferably formed from a material which: is magnetically permeable; is electrically conductive; has a relatively high electrical resistivity; and, is thermally conductive. Materials other than stainless steel may be used. Outer cup 70 may, as indicated, be formed from plastic materials, epoxies or polyimides. Moreover, the material from which outer cup 70, or a portion thereof, is formed is either transparent or translucent at a location near the light emitting means 64. The purpose for using transparent or translucent material for outer cup 70 will appear hereinafter. Since no substantial heating current is induced in either counter 22 or in the outer cup 70 of vessel 34, the material from which the outer cup 70 is formed is not subjected to elevated temperatures. For example, in the embodiment of the vessel shown in FIG. 2, outer cup 70 will be subjected to temperature significantly below 550°F. As an alternative material, outer cup 70 may be formed from any number of ceramic materials. Again, outer cup 70 if formed from ceramic materials should in part be transparent or translucent.

The induction coil 36 generates, at ultrasonic frequencies or higher, a rapidly changing magnetic field which as indicated in FIG. 2 is coupled beyond an air gap and beyond the counter 22 so as to intercept the cups 70 and 71. Heating currents are induced only in the inner cup 71; heating currents not being induced in the counter 22 or in the outer cup member 70 because of the materials employed. Because induction heating is employed and the nature of the cooking requirement, the inner cup 71 is not heated to a temperature higher than 550°F. In specifying 550°F herein some margin for safety is included. Moreover, since no substantial amount of heating current is induced in counter 22 it may be fabricated from materials which are not usable in conventional prior art electric or gas ranges. For example, counter 22 may be fabricated from epoxies, plastics, polyimides, or, as shown in FIG. 2, transparent glass treated to withstand temperatures of about 550°F. In the embodiment of the invention illustrated at FIG. 2, counter 22 is also either a transparent material or translucent material which can transmit light. In using either a transparent or translucent material for counter 22 the advantage obtained is that counter 22 may, as a result, have an uninterrupted work surface. However, counter 22 may be fabricated of an opaque material provided an aperture is provided therein for transmitting light pulses from the vessel 34 to a photodetector unit 54 located beneath counter 22.

If required for purposes of electrosatic shielding and/or structural enhancement and/or decoration, the counter 22 may also include some metallic content. However, the inclusion of metallic material in counter 22 is necessarily limited to a small amount or larger amounts so distributed as to prevent the formation of ohmic electrical circuits therein. This is necessary in order to permit substantial quantities of the power developed by the induction coil 36 to be coupled with the metallic inner cup 71 of the cooking vessel 34 for the purpose of heating the cup 71.

A temperature sensing unit in accordance with the present invention is comprised of a temperature detection unit which is incorporated in the vessel 34 and a temperature receiving uint 50. See FIGS. 2 and 7. While the induction coil 36 produces electromagnetic radiations in the ultrasonic, or higher, ranges principally for the purpose of inducing heating currents in the inner cup 71 of the vessel 34, it also provides, according to the present invention, energy for driving or powering the temperature detection unit incorporated within the vessel 34. This aspect of the invention is described in more detail hereinafter. Suffice it to state at this point that: one of the important aspects of the present invention is the capability of extracting radiated electromagnetic power locally within the vessel 34 from the main magnetic field generated by the induction coil. The extracted electrical energy is employable for powering load utilization devices generally.

The various components of the temperature detection unit which are incorporated within the vessel 34 are diagrammatically shown as being contained within the dotted line box appropriately labeled in FIG. 7. Similarly, the various components of the temperature receiving unit 50 are located within a separate dotted line box which is also appropriately labeled in FIG. 7.

Operationally, electromagnetic energy produced by induction coil 36 is coupled through an air gap and beyond counter 22 into the inner cup 71 of the vessel 34. The major portion of this energy so coupled is used for inducing heating currents in the cup-like member 71. However, as suggested in the block diagram of FIG. 7, a small portion of this electromagnetic energy is coupled to a pick-up coil 60. As shown in FIG. 2 the pick-up coil 60 is concentrically disposed around a thermistor unit 63 in vessel 34. A voltage developed across the pick-up coil 60 is delivered to the input of a rectifier 61. As shown in FIG. 2 rectifier 61 is packaged in a small space and located in the vessel 34 between the cups 70 and 71 at a location which is relatively remote from the hotter lower part of the vessel 34. In addition, as indicated at FIG. 2, the rectifier 61 is thermally insulated from the inner cup 71 by insulation material 72. Moreover, the rectifier package 61 may be suitably bonded to the outer cup 71 so as to put it in contact with a lower temperature medium. Advantageously, the rectifier 61 being so located and insulated is not subjected to elevated temperatures. The rectifier 61 develops a regulated D.C. output which is delivered to the input of a voltage controlled oscillator 62 (hereinafter referred to as VCO 62). The VCO 62 includes an additional input from a temperature sensor unit 63 which may be a thermistor unit. As indicated in FIG. 2 the thermistor unit 63 is also situated in the space between the nested cup members 70 and 71 and is in direct contact with the inner metallic cup 71 for the purpose of sensing the temperature thereof. An LED (light emitting diode) 64 is connected to the output of VCO 62 as indicated in FIGS. 3 and 7. Suitably coupled with LED 64 is a lens 64a which acts to collimate the light emitted from LED 64. As shown in FIG. 2 the LED 64 and lens 64a are located in the space between the nested cups 70 and 71, at the bottom of vessel 34 and against the inside face of the transparent or translucent cup 70. Thus, light emitted by LED 64 will be collimated in lens 64a and directed through the transparent or translucent cup member 70. Also, as indicated in FIG. 2, VCO 62 is conveniently packaged in a small space and located near the upper rim of the vessel remotely from the bottom surface of the cup member 71 in a relatively cool area of the vessel 34. The VCO 62 may be covered with insulation material 72 and, in the same manner as rectifier 61, connected to the outer cup 70 so as to be in contact with a lower temperature component.

Briefly, the temperature sensor unit 63 which is in contact with the metallic inner cup 71 changes its resistance or impedance in response to the temperature of the inner cup member 71. This change in resistance or impedance of thermistor unit 63 changes the operating voltage of VCO 62 and thereby causes VCO 62 to alter its frequency of oscillation in response to a voltage change introduced thereto by action of the thermistor unit 63. Thus, there is developed across the LED 64 a signal voltage of a frequency which varies as a function of the resistance or impedance of thermistor unit 63. The thermistor unit 63 varies its impedance or resistance as a function of the temperature of the cup member 71. In accordance with the frequency of the signal voltage developed by VCO 62, LED 64 radiates light pulses at a corresponding rate or frequency. The light pulse rate also corresponds to the temperature of the inner cup 71 as sensed by thermistor unit 63. The light pulses produced by LED 64 are conveniently collimated by the lens 64a and transmitted through the transparent or translucent cup member 70 to the outside of vessel 34 and through the transparent or translucent counter 22 where they are received by a silicon photodiode 54 or other suitable photodetector unit, which is part of the temperature receiving unit 50. As suggested in FIG. 2, among other places, the silicon photodiode 54 or photodetector may conveniently be secured to a lower surface of counter 22 so as to convert the received light pulses into a train of electrical signals which are representative of the sensed temperature of interest. The photodetector unit or silicon photodiode 54 is preferably embedded or potted within a suitable matrix of polyimide material. Light pulses transmitted to the photodetector 54 from LED 64 are converted to electrical signals by the photodetector 54 and these signals are delivered to the input of the temperature signal processing circuit 45. The signal processing circuit 45 includes a gated multivibrator which in conjunction with an RC circuit within the processing circuit 45 averages the pulses so received whereby the circuit 45 develops an output signal representative of the temperature of the vessel 34 as detected by thermistor unit 63. This output signal is delivered to the temperature indicator 30. Thus, for a particular temperature developed by the inner cup 71 in vessel 34 the thermistor 63 has a particular resistance or impedance corresponding to this temperature. The resistance of thermistor unit 63 causes a voltage change within VCO 62. The output frequency of VCO 62 is a function of this voltage change occasioned by the resistance change of thermistor unit 63. The output frequency developed by VCO 62 is delivered to LED 64 which emits a series of light pulses. This series or train of light pulses changes the conduction periods or "on time" of photodetector 54. Photodetector 54 effectively "modulates"

the temperature signal processing circuit 45 via a series of signals having conduction periods corresponding to those of the received light pulses. Thus, the temperature signal processing circuit 45 is relatively insensitive to intensity of the light pulses inasmuch as it averages the conduction times of the various pulses in the pulse train of electrical signals produced by photodetector 54. Ultimately the signal processing circuit 45 provides an output signal to temperature indicator 30 which is representative of the sensed temperature of interest.

In FIG. 2 for purposes of illustration, the cross sectional dimension of the outer cup 70 is shown as being larger than that of inner cup 71. However, it is to be understood that the cross section dimension of outer cup 70 may be equal to or smaller than the same cross sectional dimension of the inner cup 71. Also, in FIG. 2 the vessel 34 is shown as being provided with feet, such as feet 75, which are molded in the outer cup 70. It is to be understood that the inclusion of feet 75 is not absolutely necessary. However, feet such as the feet 75 are a convenient innovation in the modified form of the vessel construction hereinafter discussed with reference to FIGS. 4 and 5.

The rectifier 61 and VCO 62, as shown in FIG. 2, may be fabricated and packaged as separate or combined integrated circuits. In one form these separated integrated circuits may have the general forms or configurations illustrated in FIG. 2. Suffice it to say that: rectifier 61 and VCO 62 are preferably in the form of integrated circuits which have been miniaturized and packaged accordingly. In FIG. 2 the various electrical connections including conductors for the pick-up coil 60, rectifier 61, oscillator 62, thermistor unit 63 and LED 64 are indicated. These conductors may be arranged in the manner suggested in FIG. 2 and embedded in the insulation material 72, which is also a dielectric material. In FIG. 3 there is illustrated in the fragmentary view a modified form of counter 22 of FIG. 2; the counter in FIG. 3 being designated as counter 22a. As indicated counter 22a may be of an opaque material and fabricated from a suitable plastic, epoxy or polyimide as hereinbefore stated. However, inasmuch as light is not transmittable through the material of counter 22a, it is provided with a central aperture in which there may be located a plug 22b of light transmitting material. Thus the vessel of FIG. 2 may be employed with counter 22a wherein light pulses developed by the LED 64 are collimated by lens 64a and transmitted through the outer cup 70 to an air gap located between the top of counter 22a and the bottom of cup 70; i.e., in the space external to the vessel 34 which is between the feet 75 thereof. The light pulses are eventually transmitted through the transparent or translucent plug 22b to the photodetector 54.

In FIGS. 4 and 5 there is illustrated another modification of the vessel employed in the present invention. The vessel shown in FIG. 4 and FIG. 5 which is designated, generally, by the reference number 34a is comprised of an outer cup 70a of opaque material. Materials may be the same as those chosen for the outer cup 70 of vessel 34 shown in FIG. 2. However, the material 70a may be opaque material or it may be transparent or translucent material. The inner cup 71 is a metallic material which is formed from a relatively thin sheet of magnetic stainless steel. Electrically connected, as indicated in FIG. 4, to the inner cup 71 are a pair of terminals 80 and 81. In effect, the terminals 80 and 81 partially replace the pick-up coil 60 which was a separate component of the vessel 34 illustrated in FIG. 2. The terminals 80 and 81 which are spaced apart and connected to the inner cup 71 of vessel 34a have developed therebetween a voltage drop, or IR drop, caused by the circulating currents in the inner cup 71. These circulating currents are induced in the metallic cup member 71 by the main magnetic field produced by induction coil 36. The terminals 80 and 81 being electrically connected with the cup 71 in spaced apart relation thereon have a voltage drop developed thereacross due to the circulating currents and the voltage appearing between terminals 80 and 81 is used as the input to the rectifier 61. This is also illustrated diagrammatically at FIG. 8 whereat the terminals 80 and 81 have developed therebetween the voltage $e_{IR}$. Except for the absence of the pick-up coil 60, for which the terminals 80 and 81 have been substituted as a voltage source, the other internal components of the vessel 34a are the same as those employed with the vessel 34 shown in FIG. 2. Operationally, the system of FIG. 4 operates in the same manner as hereinbefore described with reference to FIG. 7 with the exception that the input voltage $e_{IR}$ as shown in FIG. 8 is used to drive rectifier 61.

Another important feature of the vessel 34a is better illustrated in the enlarged fragmentary diagram of FIG. 5. Secured to the outer cup 70a, which in the embodiment shown is an opaque cup, is a fiber optic means 90. For the purpose of more evenly distributing the light pulses emitted by the LED 64 there is optically coupled with the collimating lens 64a a fiber optic bundle 90. A small aperture through the bottom of the outer cup 70a is provided so as to optically couple a fiber optic bundle 90a with collimating lens 64a. Coupled with and secured to this bundle 90a is a spirally wound fiber optic ribbon 90 which "carries" and evenly distributes the light emitted from LED 64 via lens 64a and bundle 90a. As indicated in FIG. 4 this ribbon is spirally wound so as to provide a pancake-like form or disk which covers a substantial area on the outside surface of the bottom of vessel 34a; i.e., the spiral wound fiber optic ribbon 90 being disposed between the feet 75 of the outer cup 70a. Thus, evenly distributed light is transmitted through the fiber optic ribbon 90 and through the transparent counter 22 to the photodetector 54 as indicated in FIG. 5. As an alternative construction the counter 22a may be employed which may also include a large diameter aperture for accommodating a larger diameter transparent or translucent plug 22b.

Figure 6:
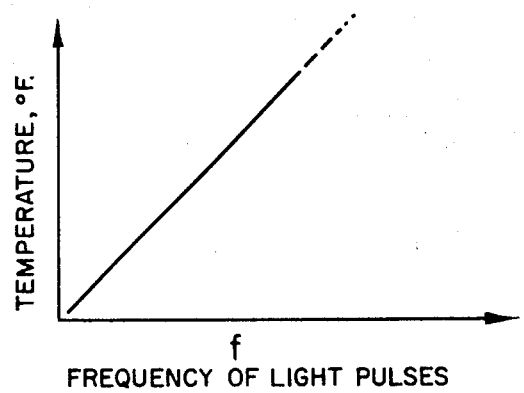
FIG. 6 is a graph showing the detected temperature of the cooking vessel employed herein as a function of the frequency of light pulses emitted by a light emitting diode (LED).

FIG. 6 is a graphical representation showing the relationship between temperature sensed by thermistor 63 as a function of the frequency or repetition rate of the light pulses emitted by LED 64.

Figures 8, 9:
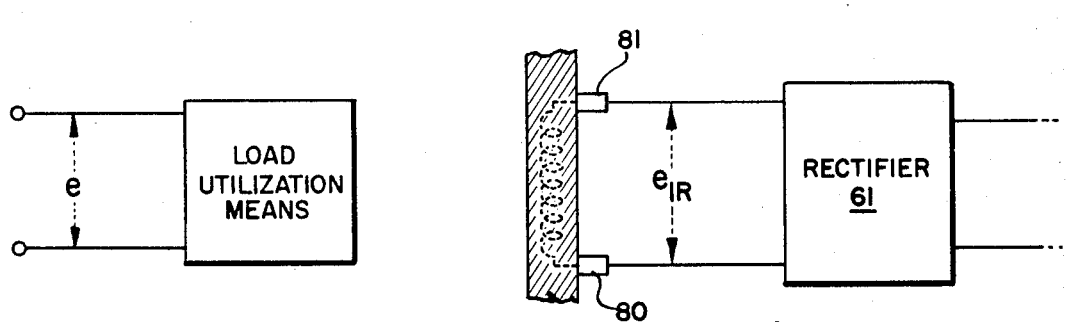
FIG. 8 is a fragmentary view showing an alternative way of extracting power from the main induction field produced by the range's induction coil, the extracted power being employed for providing signal energy for the transmission of temperature data by light pulses.
FIG. 9 is a diagrammatic illustration showing how energy extracted from the main induction field by extraction means within the vessel may be employed for powering a load utilization means in the vessel.

In FIG. 9 there is shown a voltage source which may be the same voltage source as developed between the terminals 80 and 81 in FIG. 8 or it may be the output of the pick-up coil 60. Coupled to the voltage e in FIG. 9 is a load utilization means which may be operated from the voltage e. Advantageously, power developed by the changing magnetic field produced by the main induction coil 36 as coupled into the vessel may, ultimately, be extracted as a voltage e either by a pick-up coil such as 60 or through an IR drop developed between terminals such as 80 and 81 for the purpose of providing local power or energy in the vessel for operating stirring means or other auxiliary devices requiring small amounts of power. The present invention illustrates one, among many situations where the extracted voltae e may be employed for developing signal energy as to temperature data.

Advantageously, the LED 64 employed produces monochromatic light so that filters are not required in conjunction with photodetector 54. Moreover, because of the inertialess characteristic of LED 64, as compared with other light sources (e.g., filamentary sources and glow sources), it can produce detectable light pulses at a band in the megahertz range. Hence, the very high frequency light pulses are easily discriminated by the photodetector 54 from stray interference sources such as ambient light (e.g., incandescent and fluorescent fixtures as well as sunlight). Also, of course, no interference with light pulse discrimination is occasioned by the induction coil which operates in the kilohertz range and is, of course, a non-optical device.

The control scheme herein disclosed can be interlocked with the induction surface control circuitry disclosed in, among others, the patent applications hereinbefore cross referenced.

Another very important aspect of the invention is that the voltages $e_{IR}$ and $e$ of FIGS. 8 and 9, respectively, allow for use of integrated circuits for the various components. This is so because $e_{IR}$ and $e$ are optimized at 30 volts or less. The same advantage obtains for the induced voltage produced by pick-up coil 60 in the other embodiments disclosed.

Thus, hereinbefore described by way of illustrative embodiments thereof is an induction cooking or warming appliance which includes together with a novel vessel a temperature sensing unit which is free from the spurious heating encountered in prior art electric and gas ranges. In this regard the nature of the heating source does not produce the same elevated temperatures at the same locations or within the same components. For example the induction coil 36 induces heating currents in the cup 71 rather than in the vessel support or counter 22. The temperature detection unit which is located within the vessel and the temperature receiving unit 50 are located in regions of relatively low magnetic intensity. Also the thermistor unit 63 has a resistance of the order of $10^6$ ohms so that, at best, only insignificant heating currents are induced therein. Also the thermistor leads may be twisted for the purpose of cancelling induced voltages. The various electronic components incorporated within the vessel and under the counter are not subjected to a temperature as high as the specification temperature of 550°F. Certainly these components are not subjected to the elevated temperatures of 1,600°F which occur at certain regions in prior art electric and gas ranges. In this regard the present invention discloses that the electronic components 60, 61, 62 and 64 are surrounded by thermal insulation 72 and some or all of these components may be remotely located from the element 71 which is heated and at a more elevated temperature. In addition to locating the aforesaid components remotely from higher temperature regions in the vessel, they may also be thermally connected to the outer cup members surface and hence to a lower temperature environment, or "sink."

Beneficially, with the present invention the materials of fabrication of the temperature sensing unit (temperature detection unit and components as well as the temperature receiving unit and components) are not restricted by the elevated temperatures encountered with the prior art electric and gas ranges. Hence, many materials such as plastics, epoxies, polyimides are usable in the practice of the present invention. Moreover, because there is no heat source as in prior art ranges hereinbefore described and because of the location of the various components of temperature detection and temperature receiving units, these components need not be thermally shielded or insulated in the ways or to the extent employed in prior art electric and gas ranges. With the temperature sensing unit employed in the present invention, an accurate sensing of the temperature of the vessel may be achieved. This may be done regardless of the weight of the vessel and further without regard to whether the outside surface of the vessel has an irregular surface or contour. Moreover, with the temperature sensing unit provided herein the prior art spring construction or arrangement is not required. Nor would springs be of any use in connection with temperature sensing as practiced with the present invention. Another advantageous aspect of the subject invention is that the counter 22 or vessel supporting means may have, if desired, an uninterrupted working surface on the top thereof.

Another important advantage of the present invention is that temperature data may be transmitted by wireless means in the form of light pulses to a location which can be relatively remote from the cooking or warming area.

Although the invention has been described and illustrated by means of specific embodiments thereof, it is, nevertheless, to be understood that many changes in materials, details of construction and in the combination and arrangement of parts or components may be made without departing from the spirit of the invention, the scope of which is defined in the claims hereinafter set forth.

What is claimed is:

1. In combination, an induction heating appliance and a vessel; said appliance comprising vessel supporting means for supporting said vessel, said supporting means having no substantial heating current induced therein when subjected to a changing magnetic field, an induction coil energizable for producing a main changing magnetic field, means for energizing said coil with electric power, and a temperature receiving unit included in said appliance; said vessel comprising a portion in which heating current is induced by said main changing magnetic field when said vessel is supported by said supporting means, and a temperature detection unit supported by said vessel, said temperature detection unit including a temperature sensor unit for sensing the temperature of said vessel, said temperature detection unit being energizable by said main changing magnetic field to produce light pulses representative of a temperature corresponding to the temperature sensed by said temperature sensor unit, said temperature receiving unit including means responsive to said light pulses for producing a signal representative of the temperature sensed by said temperature sensor unit.

2. The combination according to claim 1 wherein said portion of said vessel is provided with a pair of terminal means between which there is developed a voltage corresponding to the voltage drop developed by the heating currents induced in said portion by the main field of said induction coil, said voltage developed between said terminal means energizing said temperature detection unit.

3. The combination according to claim 1 wherein said temperature detection unit supported by said vessel is further comprised of a pick-up coil for developing a first voltage when subjected to said main changing magnetic field, a rectifier for converting said first voltage to a rectified second voltage, a voltage controlled oscillator energized by said second voltage for producing a variable frequency output signal, said temperature sensor unit providing an impedance corresponding to a temperature sensed by said sensor unit, said temperature sensor unit being electrically coupled with said voltage control oscillator whereby said oscillator produces an output signal of a frequency corresponding to the temperature sensed by said sensor unit, and a light emitting diode electrically coupled with said voltage controlled oscillator for producing light pulses at a rate corresponding to said output signal produced by said oscillator.

4. An inductively heatable vessel comprising: a first metallic wall member and a second non-metallic light-transmitting wall member, said wall members having portions thereof sealed together to form a sealed double-walled vessel having an enclosed space between said wall members, said first wall member forming an inside wall surface of said vessel, said first wall member having heating current induced therein when said first wall member is subjected to a changing magnetic field, a temperature detection unit located within said space between said wall members, said temperature detection unit comprising a temperature sensor unit for sensing the temperature of at least said first wall member and light emitting means energizable for producing light pulses representative of the temperature sensed by said sensor unit, said light pulses being transmitted through said second wall member.

5. The vessel according to claim 4 wherein said temperature detection unit is comprised of a pick-up coil, a rectifier, an oscillator and said light emitting means, said pick-up coil producing a first voltage in response to said changing magnetic field to which said first wall member is also subjected, said rectifier producing from said first voltage a rectified voltage, said oscillator being driven by said rectified voltage and producing a variable frequency output signal corresponding to a temperature sensed by said temperature sensor unit, said light emitting means, in response to the output signal produced by said oscillator, producing light pulses at a frequency corresponding to the output frequency of said oscillator and representing the temperature sensed by said sensor unit.

6. The vessel according to claim 4 wherein said first wall member includes a pair of terminal means between which a voltage difference is extractable, said voltage difference being produced by the voltage drop produced by the induced current flowing in said first wall member, said voltage difference being electrically coupled with said temperature detection unit for energizing said light emitting means.

7. In combination, an inductively heatable vessel and a temperature receiving unit located remotely from said vessel, said vessel comprising a first metallic wall member and a second non-metallic wall member, said wall members having portions thereof sealed together to form a double-walled vessel having an enclosed space between said walled members, said first metallic wall member forming the inside surface of said vessel, said first wall member being adapted for having heating current induced therein when subjected to a changing magnetic field, a temperature detection unit located within said space between said wall members, said temperature detection unit including a temperature sensor unit for sensing the temperature of at least said first wall member, said temperature detection unit including means for producing light pulses containing data representative of the temperature sensed by said temperature sensor unit, said vessel having filter optic means optically coupled with said light pulse producing means for transmitting the light pulses to said temperature receiving unit.

8. The combination according to claim 7 wherein said remotely located temperature receiving unit includes a photodetector optically coupled with said light pulses for producing an electrical signal therefrom representative of the temperature sensed by said temperature sensor unit of said temperature detection unit, a temperature signal processing circuit for processing the signal from said photodetector to produce another signal representative of said temperature sensed by said temperature sensor unit, and display means coupled with said temperature signal processing circuit for indicating the temperature sensed by said temperature sensor unit.

9. In combination, an induction cooking appliance and a cooking vessel, said appliance comprising vessel supporting means in which no substantial heating current is induced when subjected to a changing magnetic field, an induction coil energizable for producing a main changing magnetic field, means for energizing said induction coil with electric power of at least ultrasonic frequency, and a temperature receiving unit supported by said appliance, said vessel comprising a first metallic wall member and a second non-metallic wall member, said wall members having portions thereof sealed together to form a double-walled vessel with an enclosed space between said wall members, said first metallic wall member forming the inside surface of said vessel and being adapted for containing foodstuff to be cooked, said first wall member also being adapted for having heating current induced therein when said vessel is supported by said vessel supporting means such that said first wall member of said vessel is subjected to said main changing magnetic field, a temperature detection unit located within said space between said wall members, said temperature detection unit including a temperature sensor unit for sensing the temperature of at least said first metallic wall member, said temperature detection unit being energizable by said main changing magnetic field to produce light containing temperature data corresponding to the temperature sensed by said temperature sensor unit, said temperature receiving unit supported by said appliance including means responsive to said produced light for producing a signal representative of the temperature sensed by said temperature sensor unit.

10. The combination according to claim 9 further comprising display means responsive to the signal produced by said temperature receiving unit for indicating the temperature sensed by said temperature sensor unit.

11. The combination according to claim 9 wherein said vessel supporting means transmits light and wherein the light produced by said temperature detection unit is transmitted through said vessel supporting means to said temperature receiving unit.

12. A vessel comprising: at least one wall member defining a storage space adapted for receiving material to be heated by transfer of heat from said wall member to the received material, said wall member being comprised of material in which electrical current is induced when said wall member is subjected to a changing magnetic field, said material of said wall member having an electrical resistivity of sufficient magnitude to enable the development of significant electrical power in said wall member for dissipation in the form of heat when electrical current is induced in said wall member by action of the changing magnetic field; spaced-apart electrical terminal means, electrically connected to said wall member at different locations thereon, for providing therebetween a voltage approximately equal to the voltage drop between said different locations caused by induced current between said different locations in said wall member; and, load means supported by said vessel for utilizing said voltage.

* * * * *